(12) United States Patent
Setono

(10) Patent No.: US 7,920,450 B2
(45) Date of Patent: Apr. 5, 2011

(54) DISCRIMINATION METHOD FOR OPTICAL DISC TYPES AND OPTICAL DISC APPARATUS

(75) Inventor: Shingo Setono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 308 days.

(21) Appl. No.: 12/153,750

(22) Filed: May 23, 2008

(65) Prior Publication Data

US 2008/0298215 A1 Dec. 4, 2008

(30) Foreign Application Priority Data

May 28, 2007 (JP) ................................. 2007-139823

(51) Int. Cl.
*G11B 7/00* (2006.01)
(52) U.S. Cl. .............. 369/53.23; 369/44.23; 369/112.02
(58) Field of Classification Search ............... 369/53.23, 369/53.28, 112.23, 44.23, 44.32, 112.02, 369/53.2, 44.25, 94
See application file for complete search history.

(56) References Cited

U.S. PATENT DOCUMENTS

| | | | |
|---|---|---|---|
| 2002/0150016 A1 | 10/2002 | Yasuda et al. | 369/53.22 |
| 2004/0037197 A1* | 2/2004 | Fujiune et al. | 369/53.22 |
| 2004/0218497 A1* | 11/2004 | Choi et al. | 369/53.23 |
| 2005/0157614 A1 | 7/2005 | Ichimura et al. | 369/44.27 |
| 2006/0171275 A1 | 8/2006 | Nishikawa | 369/53.2 |
| 2006/0215500 A1* | 9/2006 | Hatanaka et al. | 369/1 |
| 2006/0239139 A1* | 10/2006 | Kataoka et al. | 369/44.23 |
| 2006/0280082 A1* | 12/2006 | Yasukawa | 369/53.2 |
| 2008/0002548 A1* | 1/2008 | Jeong | 369/53.22 |

FOREIGN PATENT DOCUMENTS

| | | |
|---|---|---|
| EP | 1 394 782 A2 | 3/2004 |
| EP | 1 770 699 A2 | 4/2007 |
| EP | 1770699 A2 * | 4/2007 |
| JP | 2004-127473 A | 4/2004 |
| JP | 2006-309809 | 9/2006 |
| JP | 2006-268958 | 10/2006 |
| JP | 2007-012177 | 1/2007 |
| JP | 2007-122850 A | 5/2007 |

* cited by examiner

*Primary Examiner* — Thang V Tran
*Assistant Examiner* — Thomas D Alunkal
(74) *Attorney, Agent, or Firm* — Morgan, Lewis & Bockius LLP

(57) ABSTRACT

An optical disc apparatus, which discriminates types of optical discs having different thicknesses of transparent layers by using the same wavelength of laser light, includes an aberration correction unit for correcting spherical aberration, an objective lens for condensing the laser beam onto a recording surface of an optical disc, an actuator for moving the objective lens with respect to the optical disc, a signal detection unit for delivering a focus error signal or a sum light signal, a control unit for controlling the aberration correction unit, the actuator and the signal detection unit. The control unit drives and sets the aberration correction unit so that the laser beam has a predetermined spherical aberration, performs a focus search operation of moving the objective lens to approach the optical disc in a state where the laser beam is projected onto the optical disc, and uses at least one of the focus error signal and the sum light signal delivered from the signal detection unit at a just focus position as an optical disc type discrimination signal.

8 Claims, 7 Drawing Sheets

Fig.3
focus error signal
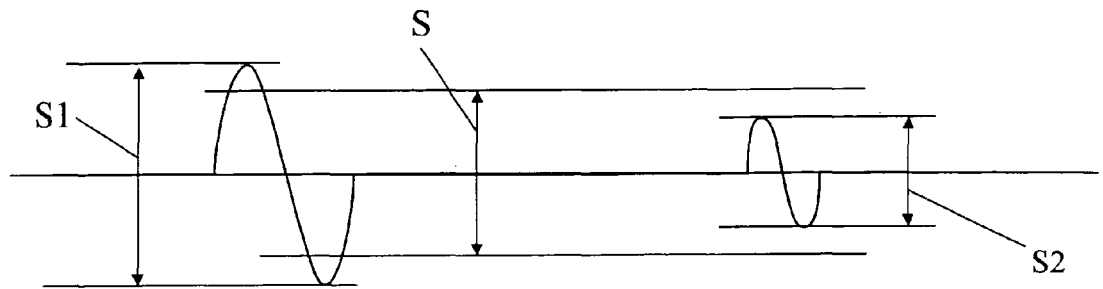
sum light signal
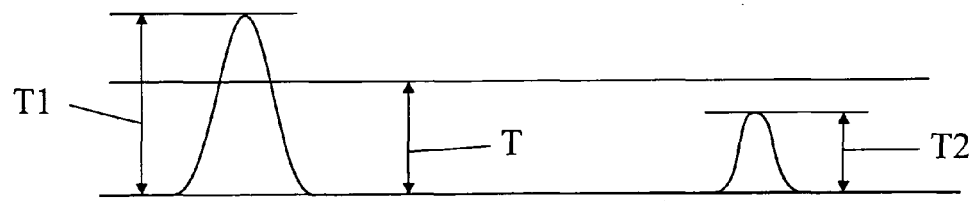

DISCRIMINATION METHOD FOR OPTICAL DISC TYPES AND OPTICAL DISC APPARATUS

This application is based on Japanese Patent Application No. 2007-139823 filed on May 28, 2007, and the contents of which are hereby incorporated by reference.

BACKGROUND OF THE INVENTION

1. Field of the Invention

The present invention relates to a discrimination method for discriminating optical discs having different thicknesses of transparent layers for which the same wavelength of laser light is used and to an optical disc apparatus using the discrimination method.

2. Description of Related Art

An optical disc apparatus is known well as using an optical disc as a recording medium for storing audio data and/or video data. The optical disc apparatus can read and write information on the optical disc by projecting a laser beam to the same.

The optical disc apparatus always detects a focus error signal for focus control. The optical disc apparatus performs a focus pull-in process based on the focus error signal so that a condensed light spot of the laser beam is focused just on a recording surface of the optical disc.

The focus pull-in process is performed as follows. The optical disc apparatus projects the laser beam onto the optical disc through an objective lens, and moves the objective lens to approach the optical disc while detecting the focus error signal. When an amplitude of the focus error signal crosses zero after exceeding a predetermined threshold value, it is determined to be a just focus point. Then, the movement of the objective lens toward the optical disc is stopped.

The optical disc apparatus is designed to be capable of reading and writing information on multiple types of optical discs, and it has a function of detecting which type of optical disc is loaded to the optical disc apparatus. In particular, a CD and a DVD are read and written by different wavelengths of laser beams, so it is very important to discriminate a type of the loaded optical disc.

The optical disc apparatus performs the above-mentioned focus pull-in process with respect to the loaded optical disc by using a laser beam for a CD and a laser beam for a DVD separately, and detects the focus error signal for each laser beam. Then, the optical disc apparatus discriminates a type of the loaded optical disc in accordance with whether or not the focus error signal satisfies the above-mentioned condition (i.e., to cross zero after exceeding a threshold value). For example, when the focus pull-in process is performed by using an optical system (a laser beam) for a CD, a point satisfying the above-mentioned condition (a just focus point) appears if the loaded optical disc is a CD while the above-mentioned condition is never satisfied if the loaded optical disc is a DVD (see JP-A-2007-12177, JP-A-2006-268958 and the like).

On the other hand, optical disc apparatuses supporting reading and writing information on a BD or an HD-DVD having a larger storage capacity have come on the market recently. Since the BD and the HD-DVD have higher recording densities, a laser beam having a shorter wavelength than the laser beam for a DVD is used for reading and writing information on the BD and the HD-DVD. Also for discrimination among a CD, a DVD, a BD and an HD-DVD, the above-mentioned discrimination method is used in which the focus pull-in process is performed with different wavelengths of lasers.

Although the same wavelength (405 nm) of laser light is used for a BD and for an HD-DVD, a thickness of a transparent layer is different between them (a BD has about 0.1 mm thickness, and an HD-DVD has about 0.6 mm thickness). In other words, a BD and an HD-DVD have different spherical aberrations due to their different thicknesses of transparent layers. Therefore, an optical pickup has an aberration correction unit for correcting the spherical aberrations of a BD and an HD-DVD so that the laser beam can be focused on each of the media.

However, if the focus pull-in process is performed by using the laser beam for which the spherical aberration correction is performed to adapt to one of the optical discs in case of optical discs such as a BD and an HD-DVD for which the same wavelength of laser light is used in the same manner as the case where the different wavelengths of laser beams are used as described above, the above-mentioned just focus point where a value of the focus error signal exceeds the threshold value and then crosses zero may appear in each of the optical discs. In this case, it is difficult to determine correctly a type of the loaded optical disc.

SUMMARY OF THE INVENTION

It is an object of the present invention to provide an optical disc type discrimination method for discriminating with high accuracy a type of an optical disc between two optical discs having different thicknesses of transparent layers for which the same wavelength of laser light is used like the case of a BD and an HD-DVD, and to provide an optical disc apparatus using the discrimination method.

An optical disc apparatus according to an embodiment of the present invention is the optical disc apparatus for reading and writing information on optical discs having different thicknesses of transparent layers by projecting the same wavelength of laser light onto the same. The optical disc apparatus includes an aberration correction unit for passing the laser beam so as to correct its spherical aberration, an objective lens for condensing the laser beam that passed through the aberration correction unit onto a recording surface of an optical disc, an actuator for moving the objective lens with respect to the optical disc, a signal detection unit for detecting reflection light from the optical disc so as to deliver a focus error signal or a sum light signal, and a control unit for controlling the aberration correction unit, the actuator and the signal detection unit. The control unit drives and sets the aberration correction unit so that the laser beam has a predetermined spherical aberration, performs a focus search operation of moving the objective lens to approach the optical disc in the state where the laser beam is projected onto the optical disc, and uses at least one of the focus error signal and the sum light signal delivered from the signal detection unit at a just focus position as an optical disc type discrimination signal.

According to this structure, it is possible to discriminate accurately optical discs having different thicknesses of transparent layers for which the same wavelength of laser light is used.

Thus, the spherical aberration correction can be performed appropriately so that deterioration of accuracy in reading and writing information can be suppressed.

In a preferred embodiment of the present invention, the control unit sets the aberration correction unit so that the laser beam has a spherical aberration for an optical disc having a thick transparent layer and spherical aberration for an optical disc having a thin transparent layer, measures amplitudes of optical disc type discrimination signals when the focus search operation is performed with the individual corrections, and discriminates types of the optical discs by comparing the measured amplitudes with predetermined threshold values of the optical disc type discrimination signal.

In a preferred embodiment of the present invention, the control unit determines that a type of the optical disc to be discriminated is a type of the optical disc that is read and written with spherical aberration correction when the optical disc type discrimination signal that exceeds the threshold value is detected.

In a preferred embodiment of the present invention, the control unit sets spherical aberration of the laser beam so that a waveform and an amplitude of the optical disc type discrimination signal are the same between the case where the focus search operation is performed for the optical disc having a thick transparent layer and the case where the focus search operation is performed for the optical disc having a thin transparent layer, performs the focus search operation in the state, and discriminates a type of the optical disc by comparing the focus drive voltage signal value supplied to the actuator when the optical disc type discrimination signal is detected with a predetermined threshold value of the focus drive voltage signal.

In a preferred embodiment of the present invention, the control unit determines that an optical disc having a thin transparent layer is loaded if the focus drive voltage signal when the optical disc type discrimination signal is detected is smaller than a threshold value, and that an optical disc having a thick transparent layer is loaded if the signal is larger than the threshold value.

In a preferred embodiment of the present invention, the optical disc having a thin transparent layer is a Blu-ray Disc while the optical disc having a thick transparent layer is an HD-DVD.

An optical disc type discrimination method according to an embodiment of the present invention is a method for discriminating types of optical discs having different thicknesses of transparent layers by using the same wavelength of laser light. The method includes an aberration correction step of correcting spherical aberration of the laser beam to be predetermined spherical aberration, a focus search step of performing a focus search operation in a state where the laser beam is projected onto the optical disc, an optical disc type discrimination signal detection step of detecting at least one of a focus error signal and a sum light signal delivered at a just focus position as an optical disc type discrimination signal, and a discrimination step of discriminating a type of the optical disc based on the optical disc type discrimination signal.

In a preferred embodiment of the present invention, the aberration correction step includes a first correction step of correcting the spherical aberration of the laser beam to be a first aberration for an optical disc having a thick transparent layer, and a second correction step of correcting the spherical aberration of the laser beam to be a second aberration for an optical disc having a thin transparent layer, the optical disc type discrimination signal detection step includes a first optical disc type discrimination signal detection step of detecting a first optical disc type discrimination signal with the first aberration, and a second optical disc type discrimination signal detection step of detecting a second optical disc type discrimination signal with the second aberration, and the discrimination step includes a threshold value read out step of reading out a predetermined threshold value of the optical disc type discrimination signal, and a comparison step of comparing the threshold value with the first optical disc type discrimination signal and the second optical disc type discrimination signal.

In a preferred embodiment of the present invention, the discrimination step includes determining that a type of the optical disc to be discriminated is the same as a type of the optical disc for which the spherical aberration correction is performed when the optical disc type discrimination signal that exceeds the threshold value is detected.

In a preferred embodiment of the present invention, the aberration correction step includes correcting the spherical aberration of the laser beam so that a waveform and an amplitude of the optical disc type discrimination signal are the same between the case where the focus search operation is performed for the optical disc having a thick transparent layer and the case where the focus search operation is performed for the optical disc having a thin transparent layer, the method further includes a voltage signal detection step of detecting a focus drive voltage signal value that is supplied to the actuator when the optical disc type discrimination signal is detected, and the discrimination step includes a comparison step of comparing the focus drive voltage signal detected by the voltage signal detection step with a predetermined threshold value of the focus drive voltage signal.

In a preferred embodiment of the present invention, the discrimination step includes determining that an optical disc having a thin transparent layer is loaded if the focus drive voltage signal when the optical disc type discrimination signal is detected is smaller than a threshold value, and that an optical disc having a thick transparent layer is loaded if the signal is larger than the threshold value.

BRIEF DESCRIPTION OF THE DRAWINGS

FIG. 3 shows a signal upon the focus search operation for an HD-DVD and a BD in the state where a spherical aberration is corrected for reading and writing information on an HD-DVD.

DETAILED DESCRIPTION OF THE PREFERRED EMBODIMENTS

Figure 1:
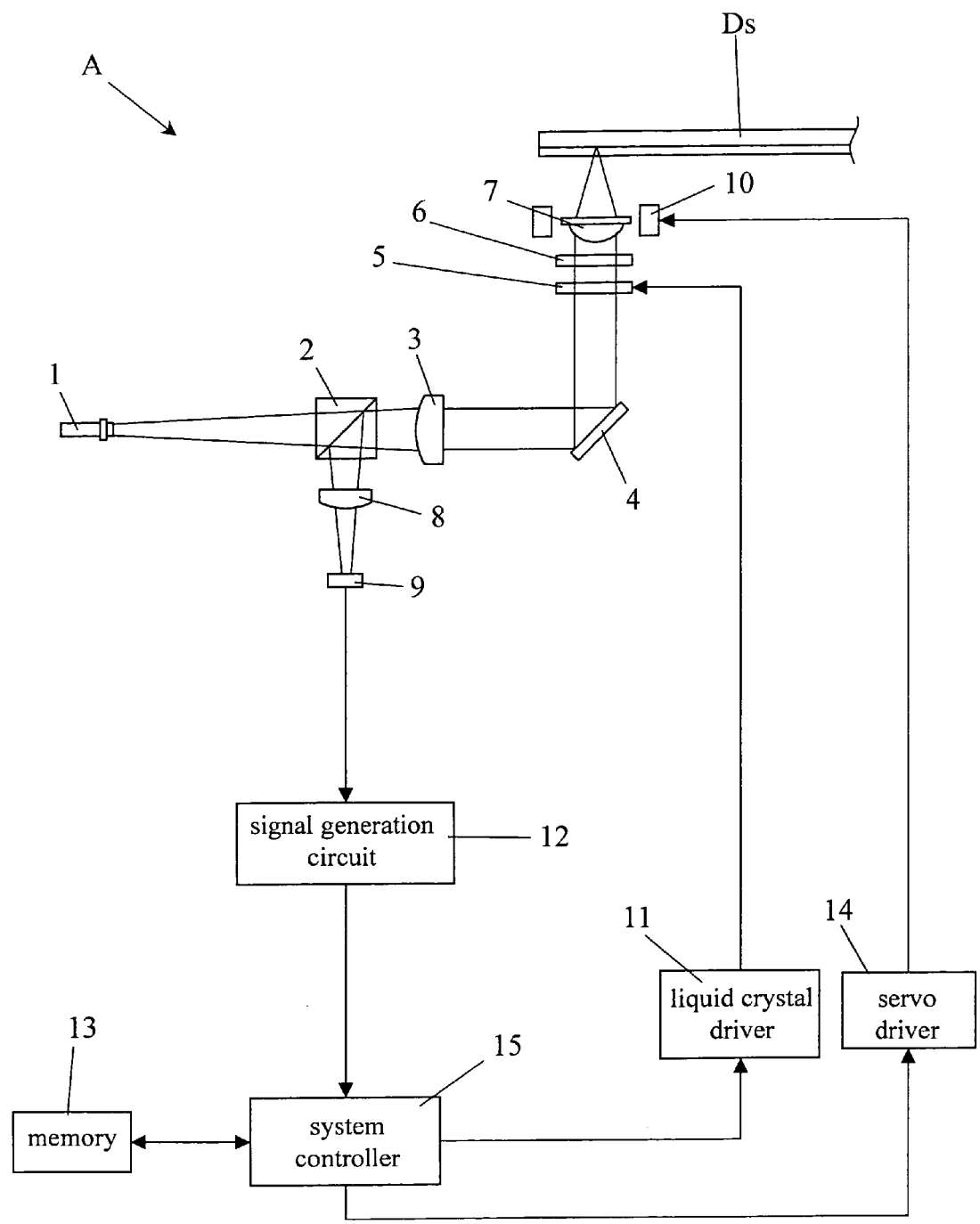
FIG. 1 is a diagram showing a structure of an example of an optical disc apparatus according to the present invention.

Hereinafter, an embodiment of the present invention will be described with reference to the attached drawings. FIG. 1 is a diagram showing a structure of an example of an optical disc apparatus according to the present invention. An optical disc apparatus A shown in FIG. 1 can reproduce information recorded on two types of optical discs including a BD medium and an HD-DVD medium. Note that the optical disc is denoted by Ds in FIG. 1 for convenience sake.

The optical disc apparatus A has a blue color laser light source 1, a polarizing beam splitter 2, a collimator lens 3, a mirror 4, a liquid crystal element 5, a quarter wavelength plate 6, an objective lens 7, a cylindrical lens 8, a light receiving part 9, an actuator 10, a liquid crystal driver 11, a signal generation circuit 12, a memory 13, a servo driver 14 and a system controller 15.

The blue laser light source 1 emits a blue color laser beam (having a wavelength of 405 nm). The blue laser beam emitted from the blue color laser light source 1 has a linear polarization.

The polarizing beam splitter 2 is a prism for passing or reflecting a laser beam having a linear polarization by its polarization direction. The blue laser beam emitted from the blue laser light source 1 is a laser beam having a linear polarization that can pass through the polarizing beam splitter 2. In addition, the blue laser beam that passed through the polarizing beam splitter 2 enters the collimator lens 3. The collimator lens 3 converts the blue laser beam passing through the same from divergent rays into parallel rays.

The objective lens 7 condenses the blue laser beam to be a laser spot on the recording surface of the optical disc Ds. The optical disc Ds has a substrate layer made of a transparent resin. When the blue laser beam passes through the substrate layer, spherical aberration is generated. This spherical aberration depends on a thickness of the substrate layer.

When the spherical aberration is generated, a condensed point of the laser beam (i.e., the laser spot) may become blurred. Otherwise, a dim halo may be generated around the laser spot. As a result, crosstalk of light projected to a track other than the track on which information is reproduced or jitter may increase so that data reproduction accuracy is lowered. According to the present invention, the liquid crystal element 5 is used for correcting the spherical aberration. The liquid crystal element 5 forms a phase shift in the radial direction of the laser beam so as to correct the spherical aberration. The blue laser beam corrected by the liquid crystal element 5 enters the quarter wavelength plate 6.

The quarter wavelength plate 6 converts the polarization of the passing laser beam from a linear polarization into a circular polarization or from a circular polarization into a linear polarization. The laser beam that passed through the quarter wavelength plate 6 is converted to have a circular polarization and is reflected by the optical disc Ds. When it passes through the quarter wavelength plate 6 again, it is converted to have a linear polarization. The laser beam that passed through the quarter wavelength plate 6 is reflected by the optical disc when its phase is shifter. When it passes through the quarter wavelength plate 6 again, a polarization direction of the laser beam is rotated by 90 degrees with respect to the laser beam emitted from the light source.

In other words, the blue laser beam that entered the quarter wavelength plate 6 before being reflected by the optical disc Ds has a linear polarization in the direction that can pass through the polarizing beam splitter 2. The blue laser beam that was reflected by the optical disc Ds and passed through the quarter wavelength plate 6 has a linear polarization in the direction that is reflected by the polarizing beam splitter 2.

The cylindrical lens 8 can condense light only in one direction and is used for sensing. The light receiving part 9 converts the received laser beam into an electric signal, which is sent to the signal generation circuit 12. The light receiving part 9 can be one that uses a photoelectric element though it is not limited to that. The light receiving part 9 receives the blue laser beam that was reflected by the polarizing beam splitter 2 and passed through the cylindrical lens 8.

The actuator 10 can move the objective lens 7 so as to approach or separate from the optical disc in accordance with a focus drive signal. The actuator 10 has the structure in which drive current (a lens drive signal) is supplied to a coil (not shown) disposed in a magnetic field formed by a permanent magnet (not shown) so that the objective lens 7 is driven by a Lorentz force, although it is not limited to the structure.

Although the actuator 10 is used for a focus operation in which the objective lens 7 is moved to approach or separate from the optical disc Ds in the present invention, other operations are also performed in accordance with necessities, including a tracking operation in which the objective lens 7 is moved in the direction along the recording surface of the optical disc and a tilt operation in which the objective lens 7 is moved so that an optical axis of the laser beam passing through the objective lens is swung.

The signal generation circuit 12 generates a known focus error signal based on the electric signal sent from the light receiving part 9. The focus error signal generated by the signal generation circuit 12 is sent to the system controller 15.

The memory 13 stores various data. The memory 13 may be a combination of a rewritable RAM (Random Access Memory), a ROM (Read Only Memory) and the like though it is not limited to the combination. The servo driver 14 generates a focus drive signal for focus driving of the actuator 10 and delivers the signal to the actuator 10.

The system controller 15 is connected to the liquid crystal driver 11, the signal generation circuit 12, the memory 13 and the servo driver 14 so as to control them. In addition, the system controller 15 in the present invention includes a processing unit such as a CPU or a microcomputer.

Note that the liquid crystal driver 11, the signal generation circuit 12 and the servo driver 14 may be disposed as separate electronic components or as an integrated electronic component including the system controller 15 and the memory 13. In addition, the liquid crystal driver 11, the signal generation circuit 12 and the servo driver 14 may be structured by software that is executed by the system controller 15, which is stored in the memory 13 or in another disposed memory and is read by the system controller 15 for execution.

Figure 2:
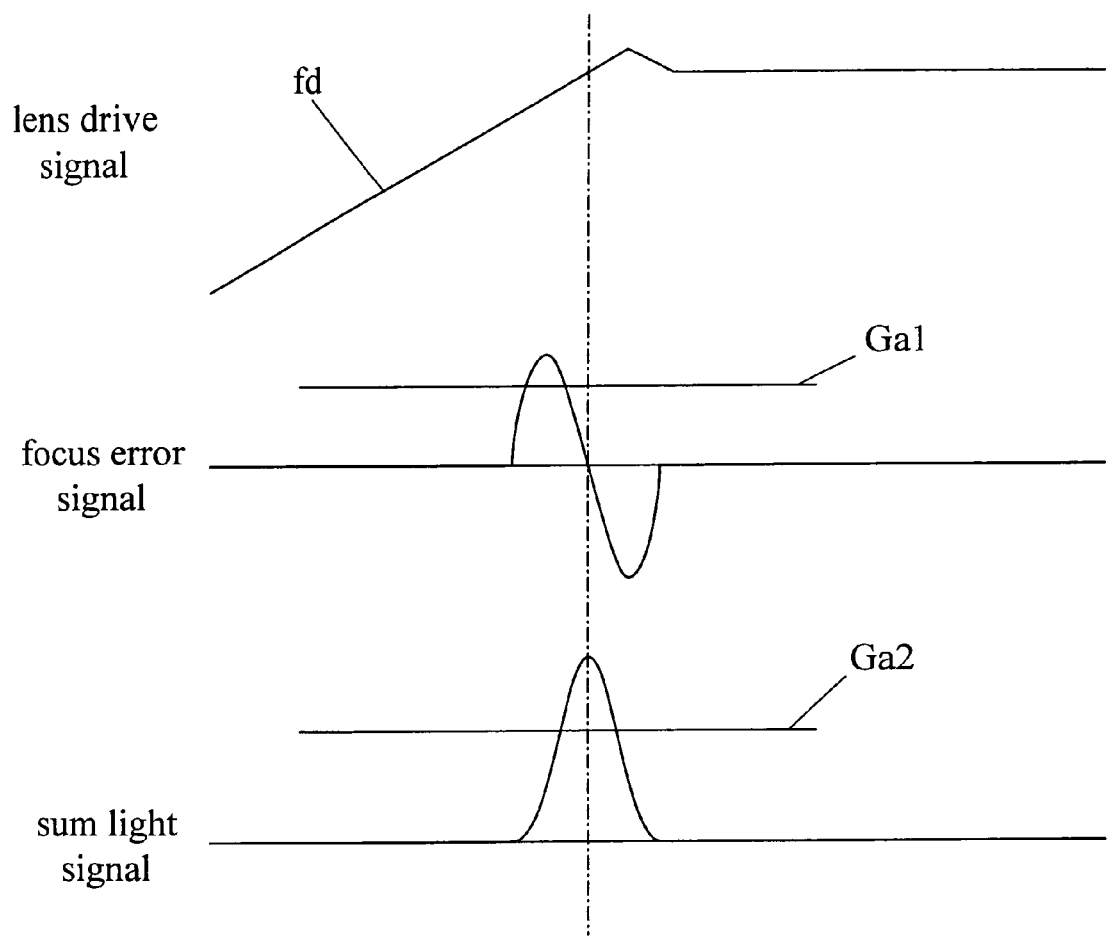
FIG. 2 is a diagram showing a focus drive voltage signal, a focus error signal and a sum light signal upon a focus search operation.

Next, a procedure for discriminating a type of an optical disc by using the optical disc apparatus A according to the present invention will be described with reference to the drawings. FIG. 2 is a diagram showing a focus drive voltage signal, a focus error signal and a sum light signal upon a focus search operation. Note that the focus search operation described here is performed by the optical disc apparatus that reads and writes information in an ordinary optical disc such as a CD or a DVD.

The system controller 15 controls the servo driver 14 to generate a lens drive voltage signal fd, which is supplied to the actuator 10 so as to make the actuator 10 operate. On this occasion, the system controller 15 controls the servo driver 14 so as to generate the lens drive voltage signal fd whose signal value increases regardless of the focus error signal. If a value of the lens drive voltage signal fd generated by the servo driver 14 increases, the actuator 10 drives the objective lens 7 to approach the optical disc.

In this case, the objective lens 7 continues to condense the laser beam, and the laser beam reflected by the recording surface of the optical disc enters the light receiving part 9 and is converted into an electric signal. The signal generation circuit 12 delivers the focus error signal and the sum light signal based on the converted electric signal (see FIG. 2). Furthermore, although both the focus error signal and the sum light signal are generated in this example, it is possible to generate either one of them.

When the objective lens 7 is moved to approach the optical disc Ds with the laser beam being condensed, the focus error signal may show an S-shaped waveform while the sum light signal show a mountain waveform having a peak, as shown in FIG. 2. The system controller 15 detects the point as a just focus position where an amplitude of the focus error signal exceeds a predetermined threshold value and then crosses zero, and the focus search operation is finished. In addition, it is the same for the sum light signal, which exceeds a threshold value at a vicinity of the just focus position and has the largest amplitude at the just focus position.

Since the focus search operation is performed as described above, the laser beam can be condensed correctly on the recording surface of the optical disc Ds so that the reading and writing operation can be performed stably. An amplitude of the S-shaped waveform of the focus error signal may change largely or its center position may be shifted in accordance with the spherical aberration of the laser beam. There, the system controller 15 compares an amplitude of the focus error signal from peak to peak with a threshold value so that the focus search operation can be performed.

FIG. 3 shows the focus error signal and the sum light signal upon the focus search operation for an HD-DVD and a BD in the state where the spherical aberration is corrected for reading and writing information on an HD-DVD. In the focus search operation shown in FIG. 3, the spherical aberration correction of the optical pickup is performed for an HD-DVD. When the focus error signal is generated for an HD-DVD, an S-shaped waveform having an amplitude S1 larger than a threshold value S is generated similarly to that shown in FIG. 2.

On the other hand, if the focus error signal is generated for a BD by the optical pickup having the same structure, an S-shaped waveform having an amplitude smaller than the threshold value S is generated as shown in FIG. 3. If a spherical aberration correction quantity is not appropriate in this way, the S-shaped waveform having a small amplitude is generated. Furthermore, a sum light signal T1 when the focus search operation is performed for an HD-DVD is large while a sum light signal T2 when the focus search operation is performed for a BD is small in the same manner.

Figure 4:
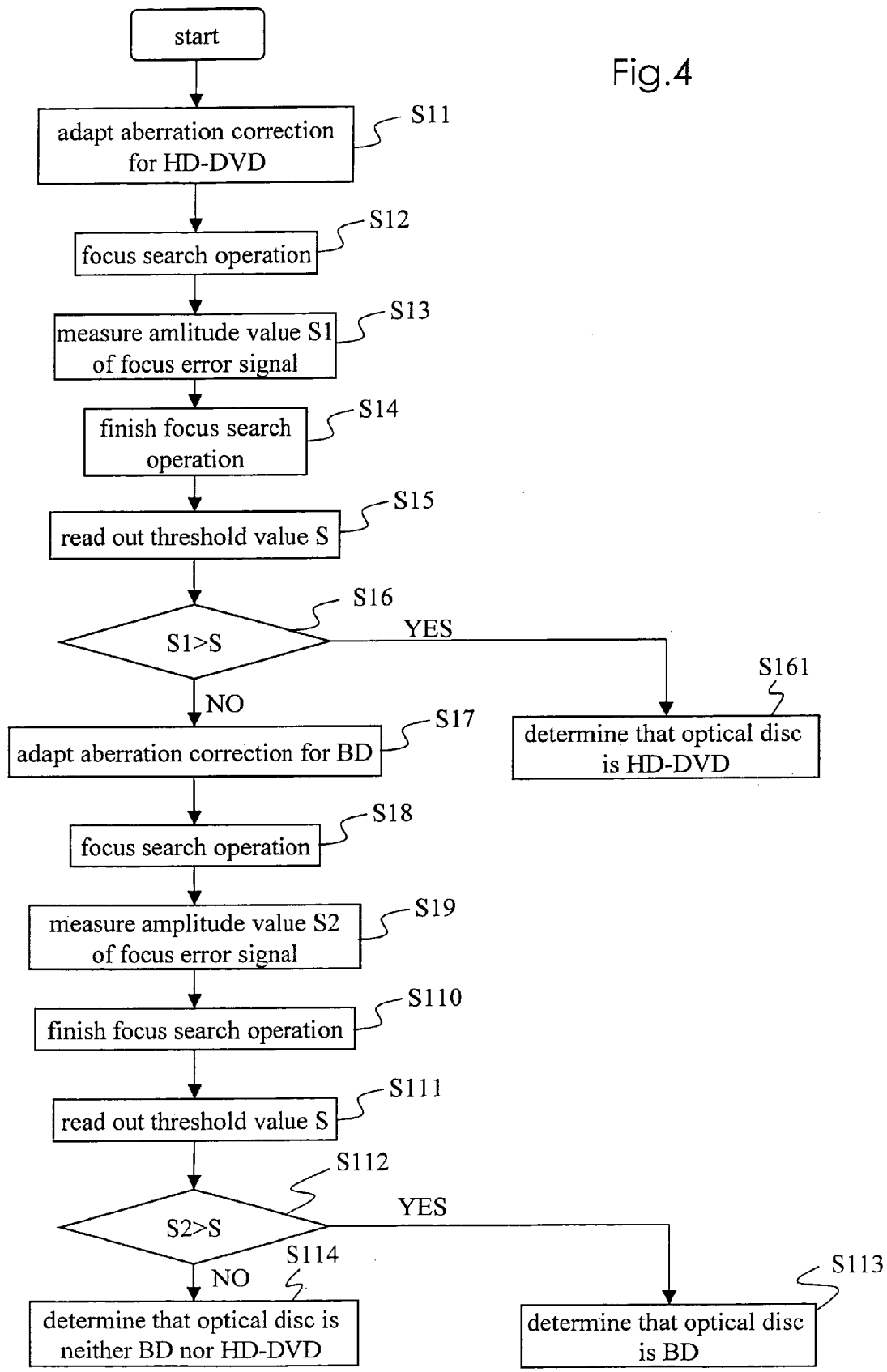
FIG. 4 is a flowchart of an optical disc type discrimination method.

The discrimination method of an optical disc type utilizing the above-mentioned characteristic will be described below. FIG. 4 is a flowchart of the optical disc type discrimination method. The method uses the focus error signal as an optical disc type discrimination signal. First, the system controller 15 controls the liquid crystal driver 11 so that the spherical aberration correction quantity of the laser beam passing through the liquid crystal element 5 is adapted for an HD-DVD having a thick transparent layer (Step S11). Note that the reason why the spherical aberration correction quantity of the laser beam is corrected first for an HD-DVD having a thick transparent layer is that contact of the objective lens 7 with the optical disc can be suppressed even if a BD is loaded, because an HD-DVD has a longer working distance so that a distance between the objective lens and the optical disc in the just focus position is long. In this state, the laser light source 1 is driven to emit a laser beam.

In this state, the system controller 15 controls the servo driver 14. The servo driver 14 delivers to the actuator 10 the focus drive voltage signal for moving the objective lens 7 to approach the optical disc for performing the focus search operation (Step S12). On this occasion, the laser beam reflected by the optical disc is converted into an electric signal by the light receiving element 9. The signal generation circuit 12 sends the electric signal as the focus error signal to the system controller 15. The system controller 15 records in the memory 13 the amplitude value S1 of the focus error signal at the just focus position (in which the focus error signal has an S-shaped waveform and crosses zero) (Step S13), and the focus search operation is finished (Step S14).

The system controller 15 reads out the predetermined threshold value S of the focus error signal from the memory 13 (Step S15). The system controller 15 compares the threshold value S with the amplitude value S1 of the focus error signal when the focus search operation is performed in the state where the spherical aberration is corrected for reading and writing information on an HD-DVD (Step S16). If the amplitude value S1 is larger than the threshold value S (YES in Step S16), the system controller 15 determines that the loaded optical disc is an HD-DVD (Step S161).

If the amplitude value S1 is smaller than the threshold value S (NO in Step S112), the system controller 15 controls the liquid crystal driver 11 so that the spherical aberration correction quantity of the liquid crystal element 5 is adjusted to be adapted for a BD (Step S17). In this state, the focus search operation is performed (Step S18), an amplitude S2 of the focus error signal is recorded in the memory (Step S19), and the focus search operation is finished (Step S110) in the same manner as described above.

The system controller 15 reads out the predetermined threshold value S of the focus error signal from the memory 13 (Step S111). The system controller 15 compares the threshold value S with an amplitude value S2 of the focus error signal when the focus search operation is performed in the state where the spherical aberration is corrected for reading and writing information on a BD (Step S112). If the amplitude value S2 is larger than the threshold value S (YES in Step S112), the system controller 15 determines that the loaded optical disc is a BD (Step S113). If the amplitude value S2 is smaller than the threshold value S (NO in Step S112), the system controller 15 determines that the loaded optical disc is neither an HD-DVD nor a BD (Step S114), and the discrimination is finished. After that, the discrimination is performed after the setting of the optical pickup is switched to a CD or a DVD though it is not shown in the drawings. Furthermore, although it is not shown in the drawings, there is a step of preventing the objective lens from approaching too close to the optical disc so that the lens drive signal does not become higher than a predetermined value when the focus search operation for an HD-DVD and a BD is performed.

Figure 5:
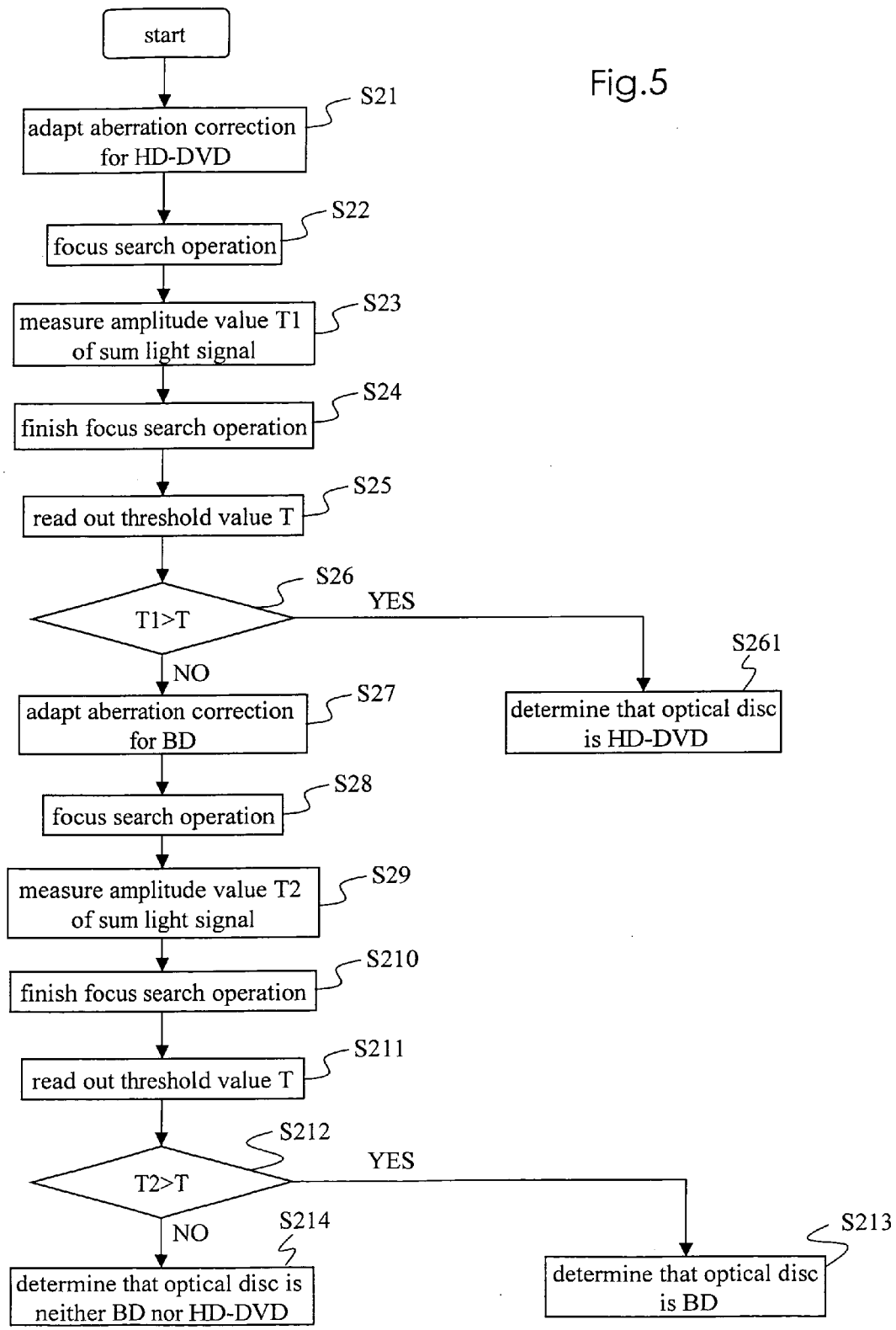
FIG. 5 is a flowchart of the optical disc type discrimination method.

FIG. 5 is a flowchart of the optical disc type discrimination method. Although the procedure thereof is the same as that shown in FIG. 4, this method uses the sum light signal as the optical disc type discrimination signal. First, the system controller 15 controls the liquid crystal driver 11 so that the spherical aberration correction quantity of the liquid crystal element 5 is adapted for an HD-DVD having a thick transparent layer (Step S21). Note that the reason why the spherical aberration correction quantity of the laser beam is corrected first for an HD-DVD having a thick transparent layer is that contact of the objective lens 7 with the optical disc can be suppressed even if a BD is loaded, because an HD-DVD has a longer working distance so that a distance between the objective lens and the optical disc in the just focus position is long.

In this state, the system controller 15 controls the servo driver 14 to deliver to the actuator 10 the focus drive voltage signal for moving the objective lens 7 to approach the optical disc (Step S22). On this occasion, the laser beam reflected by the optical disc is converted into an electric signal by a light receiving element 9. The signal generation circuit 12 generates the sum light signal from the electric signal and delivers the sum light signal to the system controller 15. The system controller 15 records in the memory 13 an amplitude value T1 of the sum light signal at the just focus position (in which the focus error signal has an S-shaped waveform and crosses zero) (Step S23), and the focus search operation is finished (Step S24).

The system controller 15 reads out a predetermined threshold value T of the sum light signal from the memory 13 (Step S25). The system controller 15 compares the threshold value T with the amplitude value T1 of the sum light signal when the focus search operation is performed in the state where the spherical aberration is corrected for reading and writing information on an HD-DVD (Step S26). If the amplitude value T1 is larger than the threshold value T (YES in Step S26), the system controller 15 determines that the loaded optical disc is an HD-DVD (Step S261).

If the amplitude value T1 is smaller than the threshold value T (NO in Step S26), the system controller 15 controls the liquid crystal driver 11 so that the spherical aberration correction quantity of the liquid crystal element 5 is adjusted to be adapted for a BD (Step S27). In this state, the focus search operation is performed (Step S28), an amplitude T2 of the sum light signal at the just focus position is recorded in the memory (Step S29), and the focus search operation is finished (Step S210) in the same manner as described above.

The system controller 15 reads out the predetermined threshold value T of the sum light signal from the memory 13 (Step S211). The system controller 15 compares the threshold value T with an amplitude value T2 of the sum light signal when the focus search operation is performed in the state where the spherical aberration is corrected for reading and writing information on a BD (Step S212). If the amplitude value T2 is larger than the threshold value T (YES in Step S212), the system controller 15 determines that the loaded optical disc is a BD (Step S113). If the amplitude value T2 is smaller than the threshold value T (NO in Step S212), the system controller 15 determines that the loaded optical disc is neither an HD-DVD nor a BD (Step S214), and the discrimination is finished. After that, the discrimination is performed after the setting of the optical pickup is switched to a CD or a DVD though it is not shown in the drawings.

Thus, the focus search operation is performed while switching the spherical aberration correction, and then the focus error signal or the sum light signal is compared with the threshold value, so that types of optical discs having different thicknesses of transparent layers for which the same wavelength of laser is used can be discriminated with high accuracy.

Figure 6:
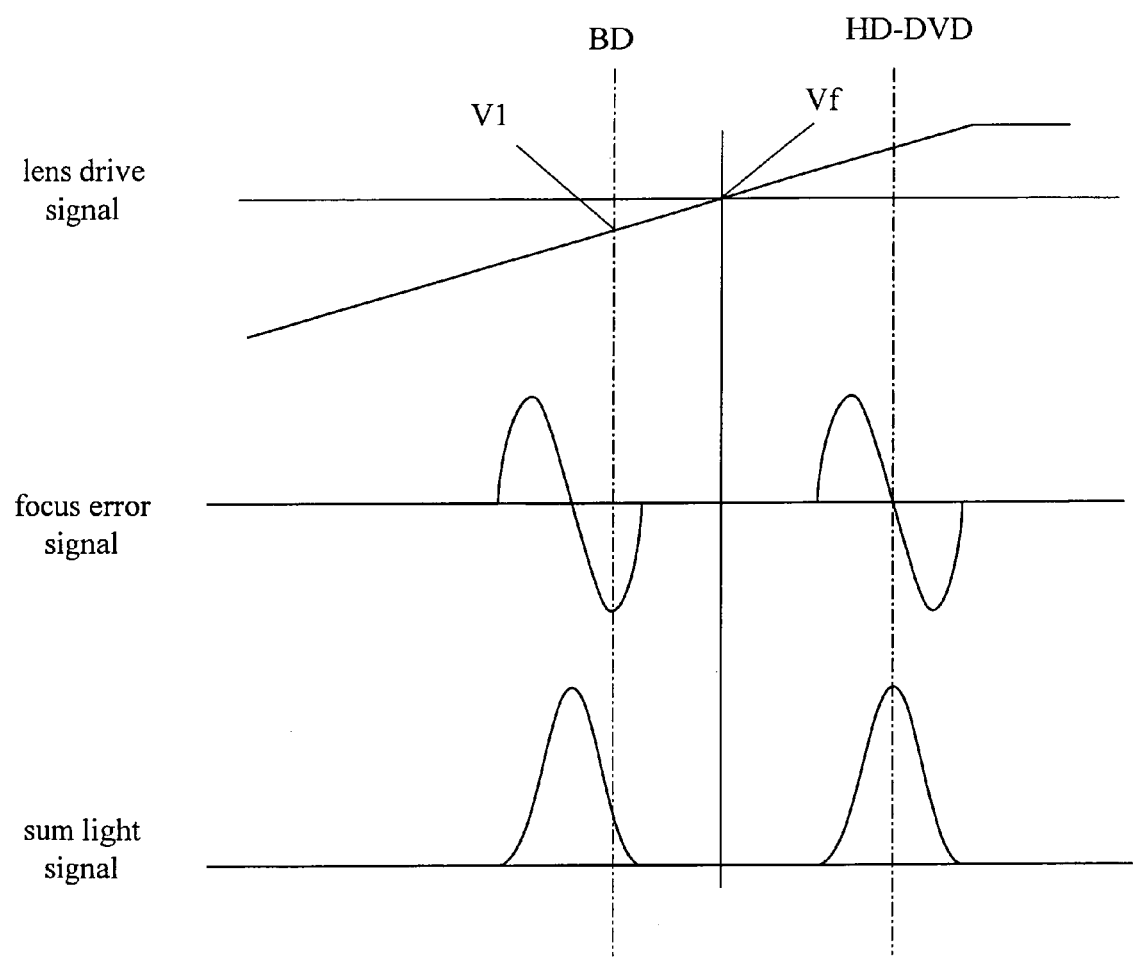
FIG. 6 shows signals upon the focus search operation for an HD-DVD and a BD in the state where a spherical aberration is corrected by a predetermined correction quantity.

Furthermore, another example of the discrimination method according to the present invention will be described with reference to the drawings. FIG. 6 shows signals when the focus search operation is performed. In the spherical aberration correction described above, the system controller 15 controls the liquid crystal driver 11 so that spherical aberration correction quantity of the laser beam is adapted for an HD-DVD or a BD. On the other hand, if the spherical aberration of the laser beam is corrected appropriately, the amplitude of the focus error signal or the sum light signal at the just focus position in the focus search operation can be substantially the same value between the case where the focus search operation is performed for an HD-DVD and the case where the focus search operation is performed for a BD.

An HD-DVD and a BD have different thicknesses of transparent layers. Therefore, a movement of the objective lens 7 is larger in the case where the focus search operation is performed for an HD-DVD having a thick transparent layer than in the case where the focus search operation is performed for a BD having a thin transparent layer. This characteristic is utilized for discriminating a type of the optical disc. Note that this spherical aberration correction state is referred to as an intermediate aberration correction state for convenience sake.

Figure 7:
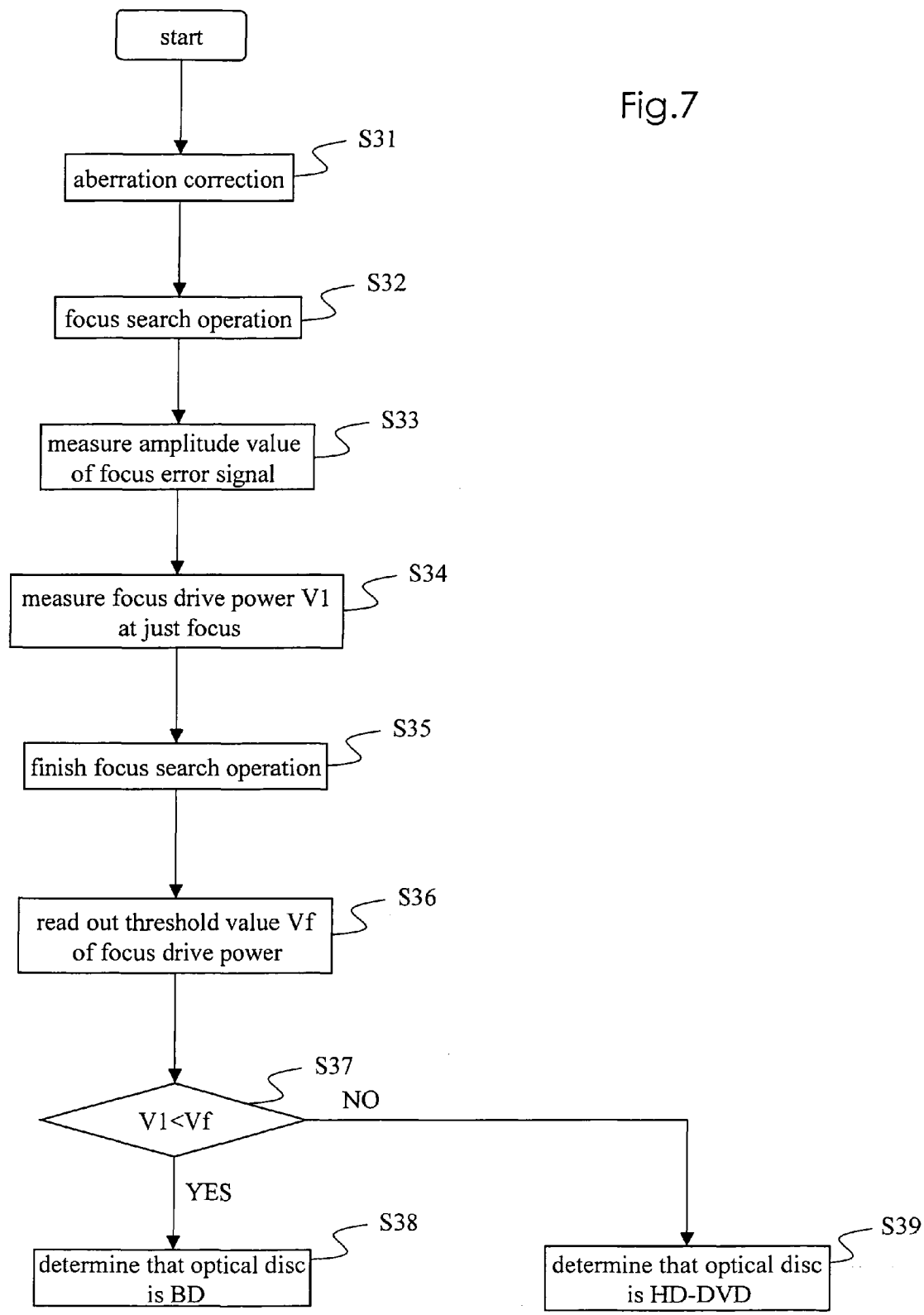
FIG. 7 is a flowchart of another example of a discrimination method of an optical disc type according to the present invention.

FIG. 7 is a flowchart of another example of a discrimination method of an optical disc type according to the present invention. The system controller 15 controls the liquid crystal driver 11 so that the spherical aberration correction quantity of the liquid crystal element 5 becomes the intermediate aberration correction state (Step S31).

The system controller 15 controls the servo driver 14. The servo driver 14 delivers the focus drive voltage signal to the actuator 10 for moving the objective lens 7 to approach the optical disc, so as to perform the focus search operation (Step S32). On this occasion, the laser beam reflected by the optical disc is converted into an electric signal by the light receiving element 9. The signal generation circuit 12 generates the electric signal as the focus error signal, which is sent to the system controller 15. The system controller 15 receives a signal value V1 of a focus drive power signal at the just focus position (in which the focus error signal has an S-shaped waveform and crosses zero) (Step S34), and the focus search operation is finished (Step S35).

The system controller 15 reads out a threshold value Vf of the focus drive power signal stored in the memory 13 in advance (Step S36) and compares the same with the signal value V1 of the focus drive power signal received in Step S34 (Step S37). If the focus drive power signal V1 is smaller than the threshold value Vf (YES in Step S37), the system controller 15 determines that the loaded optical disc is a BD having a thin transparent layer since the objective lens 7 has moved to the just focus position with a small movement as described above (Step S38). In addition, if the signal value V1 of the focus drive power signal is larger than the threshold value Vf (NO in Step S37), the system controller 15 determines that the loaded optical disc is an HD-DVD since the movement of the objective lens 7 is large (Step S39).

Although the focus drive voltage signal is detected based on the focus error signal in the method shown in FIG. 7, it may be detected based on the sum light signal. If a peak of the sum light signal is detected as shown in FIG. 2, it means that the optical pickup is moved to the just focus position. Utilizing this characteristic, it is possible to discriminate an optical disc type in the same manner as the method shown in FIG. 7.

Although the focus error signal or the sum light signal is used by itself in the examples described above, it is possible to adopt another structure in which comparison results between the individual signals and the threshold values thereof are used comprehensively for the discrimination. In this case, the discrimination can be performed more accurately.

The discrimination method shown in FIGS. 4 and 5 is preferably used in the case where an optical disc other than a BD or an HD-DVD may be loaded, while the discrimination method shown in FIG. 7 is preferably used in the case where the loaded optical disc is a BD or an HD-DVD. For example, the method shown in FIGS. 4 and 5 is preferably performed just after the optical disc apparatus is powered on or just after an optical disc is loaded to the optical disc apparatus, while the method shown in FIG. 7 is preferably performed after the loaded optical disc has been once determined to be neither a DVD nor a CD.

Although a BD and an HD-DVD are exemplified as the optical discs having different thicknesses of transparent layers for which the same wavelength of laser light is used in the examples described above, they should not be regarded as limitations. In addition, although the unit having the liquid crystal element and the liquid crystal driver is exemplified as the correction unit for correcting spherical aberration in the examples described above, it should not be regarded as a limitation. It is possible to adopt widely a unit capable of setting a variable spherical aberration of the laser beam such as one correcting spherical aberration by adjusting a distance between two lenses.

The present invention can be used in optical disc apparatuses that discriminate optical disc types such as a BD and an HD-DVD for which the same wavelength of laser light is used.

What is claimed is:

1. An optical disc apparatus for reading and writing information on optical discs having different thicknesses of transparent layers by projecting a same wavelength of laser light onto the same, the apparatus comprising:
    an aberration correction unit for passing the laser beam so as to correct its spherical aberration;
    an objective lens for condensing the laser beam that passed through the aberration correction unit onto a recording surface of an optical disc;
    an actuator for moving the objective lens with respect to the optical disc;
    a signal detection unit for detecting reflection light from the optical disc so as to deliver a focus error signal or a sum light signal; and
    a control unit for controlling the aberration correction unit, the actuator and the signal detection unit, wherein
    the control unit drives and sets the aberration correction unit so that the laser beam has a predetermined spherical aberration, performs a focus search operation of moving the objective lens to approach the optical disc in a state where the laser beam is projected onto the optical disc, and uses at least one of the focus error signal and the sum light signal delivered from the signal detection unit at a just focus position as an optical disc type discrimination signal, and
    the control unit sets spherical aberration of the laser beam so that a waveform and an amplitude of the optical disc type discrimination signal are the same between the case where the focus search operation is performed for the optical disc having a thick transparent layer and the case where the focus search operation is performed for the optical disc having a thin transparent layer, performs the focus search operation, and discriminates a type of the optical disc by comparing the focus drive voltage signal value supplied to the actuator when the optical disc type discrimination signal is detected with a predetermined threshold value of the focus drive voltage signal.

2. The optical disc apparatus according to claim 1, wherein the control unit determines that an optical disc having a thin transparent layer is loaded if the focus drive voltage signal when the optical disc type discrimination signal is detected is smaller than a threshold value, and that an optical disc having a thick transparent layer is loaded if the signal is larger than the threshold value.

3. The optical disc apparatus according to claim 1, wherein the optical disc having a thin transparent layer is a Blu-ray Disc while the optical disc having a thick transparent layer is an HD-DVD.

4. The optical disc apparatus according to claim 2, wherein the optical disc having a thin transparent layer is a Blu-ray Disc while the optical disc having a thick transparent layer is an HD-DVD.

5. An optical disc type discrimination method for discriminating types of optical discs having different thicknesses of transparent layers by using a same wavelength of laser light, the method comprising:
    an aberration correction step of correcting spherical aberration of the laser beam to be predetermined spherical aberration;
    a focus search step of performing a focus search operation in a state where the laser beam is projected onto the optical disc;
    an optical disc type discrimination signal detection step of detecting at least one of a focus error signal and a sum light signal delivered at a just focus position as an optical disc type discrimination signal; and
    a discrimination step of discriminating a type of the optical disc based on the optical disc type discrimination signal, wherein
    the aberration correction step includes correcting the spherical aberration of the laser beam so that a waveform and an amplitude of the optical disc type discrimination signal are the same between the case where the focus search operation is performed for the optical disc having a thick transparent layer and the case where the focus search operation is performed for the optical disc having a thin transparent layer,
    the method further includes a voltage signal detection step of detecting a focus drive voltage signal value that is supplied to the actuator when the optical disc type discrimination signal is detected, and
    the discrimination step includes a comparison step of comparing the focus drive voltage signal detected by the voltage signal detection step with a predetermined threshold value of the focus drive voltage signal.

6. The optical disc type discrimination method according to claim 5, wherein the discrimination step includes determining that an optical disc having a thin transparent layer is loaded if the focus drive voltage signal when the optical disc type discrimination signal is detected is smaller than a threshold value, and that an optical disc having a thick transparent layer is loaded if the signal is larger than the threshold value.

7. The optical disc type discrimination method according to claim 5, wherein the optical disc having a thin transparent layer is a Blu-ray Disc while the optical disc having a thick transparent layer is an HD-DVD.

8. The optical disc type discrimination method according to claim 6, wherein the optical disc having a thin transparent layer is a Blu-ray Disc while the optical disc having a thick transparent layer is an HD-DVD.

* * * * *